United States Patent
Colombera

[19]

[11] Patent Number: 6,029,480

[45] Date of Patent: Feb. 29, 2000

[54] WASHING MACHINE WITH IMPROVED ANCHORING MEANS FOR THE WASHING ASSEMBLY

[75] Inventor: Giovanni Colombera, Pordenone, Italy

[73] Assignee: Electrolux Zanussi S.P.A., Pordenone, Italy

[21] Appl. No.: 09/206,870

[22] Filed: Dec. 8, 1998

[30] Foreign Application Priority Data

Dec. 22, 1997 [IT] Italy .................................. PN97A0071

[51] Int. Cl.[7] .................................................. D06F 37/24
[52] U.S. Cl. ........................... 68/23.1; 68/23.3; 248/636; 248/638; 210/149
[58] Field of Search .................. 68/23.3, 23.1; 248/636, 638; 210/144

[56] References Cited

U.S. PATENT DOCUMENTS

| | | | |
|---|---|---|---|
| 2,296,261 | 9/1942 | Breckenridge et al. | 68/23.1 |
| 2,613,837 | 10/1952 | Morton | 68/23.1 |
| 2,651,482 | 9/1953 | O'Connor | 68/23.3 |
| 4,577,826 | 3/1986 | Bergstrom et al. | 248/638 |
| 5,520,029 | 5/1996 | Savkar | 68/23.3 |
| 5,613,380 | 3/1997 | Savkar | 68/23.1 |

FOREIGN PATENT DOCUMENTS

| | | | |
|---|---|---|---|
| 111336 | 8/1944 | Denmark | 68/23.3 |
| 1216800 | 5/1966 | Germany | 68/23.1 |
| 2837801 | 2/1980 | Germany | 68/23.1 |
| 59-149184 | 8/1984 | Japan | 68/23.3 |
| 62-277996 | 12/1987 | Japan | 68/23.3 |
| 1557220 | 4/1990 | Russian Federation | 68/23.1 |

*Primary Examiner*—Frankie L. Stinson
*Attorney, Agent, or Firm*—Pearne, Gordon, McCoy & Granger LLP

[57] ABSTRACT

A washing machine in which the washing assembly (3) is anchored to the stationary structure (1) by means of anchoring devices (2), each one of which includes at least two elastic elements (10, 20) arranged in series and enclosed in a rigid housing (50). Firmly secured to first end portions (11, 21) of the elastic elements (10, 20) there are rigid elements (14, 24) that extend inside the respective elastic elements (10, 20) and have their free end portions in the shape of hooks (15, 25) defining the anchoring points of the device (2). The free end portions (15, 25) protrude from apertures (33, 43) provided in mutually opposed bottom portions (32, 42) of the housing (50) against which are capable of abutting the second end portions (12, 22) of the same elastic elements (10, 20). As a result, the latter are subject to a variable extent of compression during the washing cycle.

7 Claims, 3 Drawing Sheets

WASHING MACHINE WITH IMPROVED ANCHORING MEANS FOR THE WASHING ASSEMBLY

BACKGROUND OF THE INVENTION

The present invention refers to a washing machine, in particular such a washing machine for residential and similar uses. As used here, the term washing machine shall be understood to include also similar appliances, such as washer-driers.

Washing machines are generally known to comprise an outer stationary structure (which is generally referred to as "casing") and an internal washing or oscillating assembly which includes a tub enclosing and supporting a rotating drum driven by an electric motor. Elastic or spring elements, which may sometimes be integrated into friction-type shock-absorbing anchoring devices, are generally used to anchor such a washing assembly to said outer stationary structure.

Examples of the prior art are the washing machines disclosed in FR-A-2 531461, EP-A-80 243 and EP-A-265 004.

BRIEF SUMMARY OF THE INVENTION

It is a main purpose of the present invention to provide an improved anchoring of the washing assembly to the outer stationary structure for facilitating fabrication of the washing machine, reducing costs and boosting reliability thereof. These are of paramount importance for mass-manufacturing companies with an output that usually reaches up to several hundreds of thousands of units per year.

BRIEF DESCRIPTION OF THE SEVERAL VIEWS OF THE DRAWING

A washing machine having the features as recited in the appended claims enables these and further aims to be reached, as will become more readily apparent from the detailed description that is given below by way of non-limiting example with reference to the accompanying drawings, in which:

DESCRIPTION OF THE INVENTION

Figure 1:
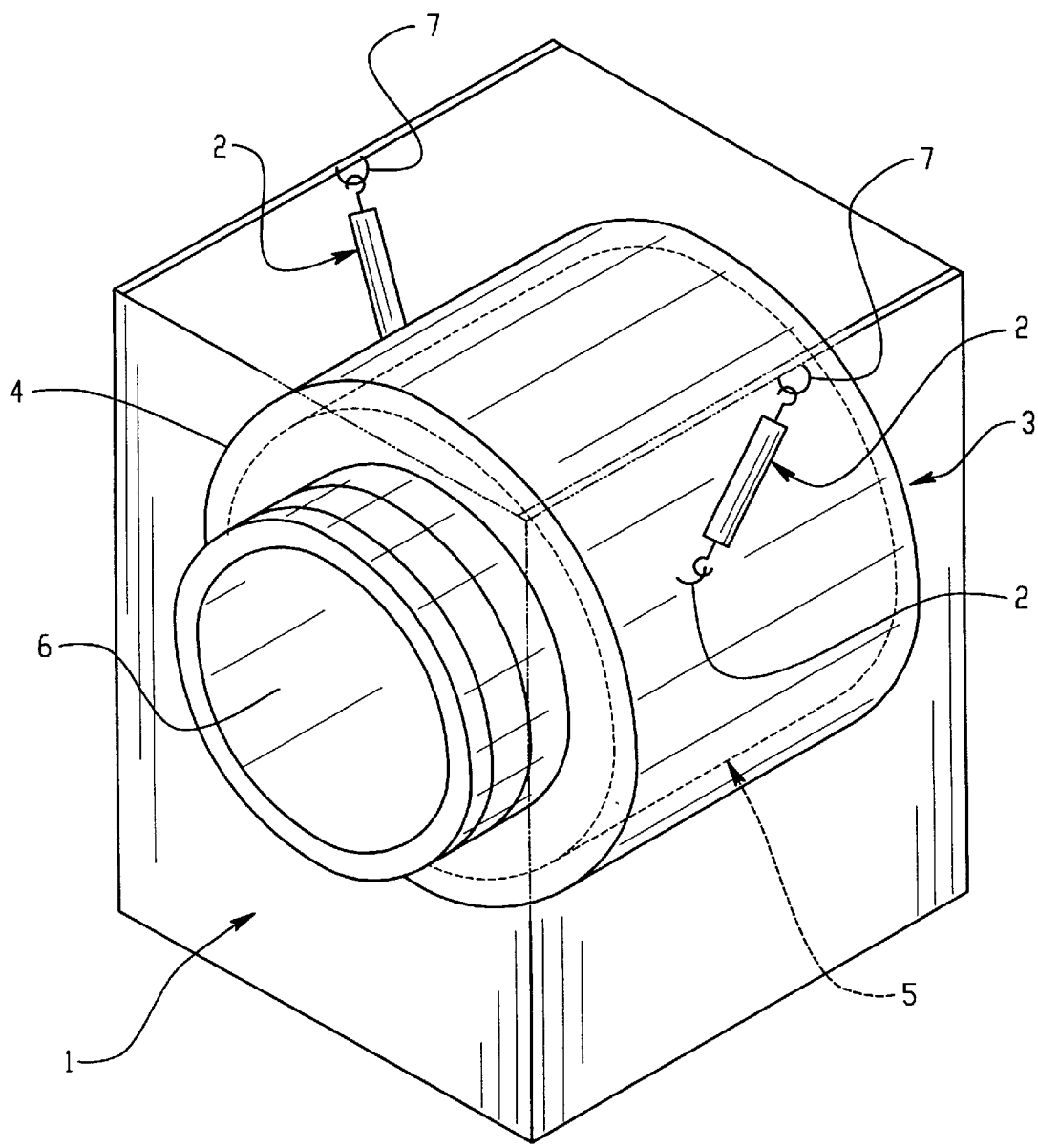
FIG. 1 is a simplified schematic view of a household washing machine of the front-loading type.

With particular reference to FIG. 1, a household-type washing machine includes an outer stationary structure 1, in the form of an outer casing. At least one pair of anchoring devices 2 elastically anchors a washing assembly 3 to the stationary structure. The washing assembly 3 includes an approximately cylindrical tub 4 that accommodates a drum 5 that is arranged to rotate about a substantially horizontal axis as driven by an electric motor (not shown).

The anchoring devices 2 are hooked to eyelets 7, which are integral with side walls of the stationary structure 1. Opposite ends of the anchoring devices are hooked to eyelets 8 that are integral with the outer surface of the tub 4 and, therefore, integral with the washing assembly 3. Loading and unloading of the clothes to be washed, ie. the washload, occur through a circular aperture 6 provided in the front portion of the washing assembly 3. An associated aperture, capable of being closed with a corresponding door (not shown), is provided in the front wall of the stationary structure 1.

The washing machine is not described here any further in its overall construction owing to the fact that no further details are needed to ensure an adequate understanding the present invention. The washing machine might alternatively be of the top-loading type, considering the universal nature of the anchoring means according to the present invention as far as the application scope thereof is concerned.

Figure 2:
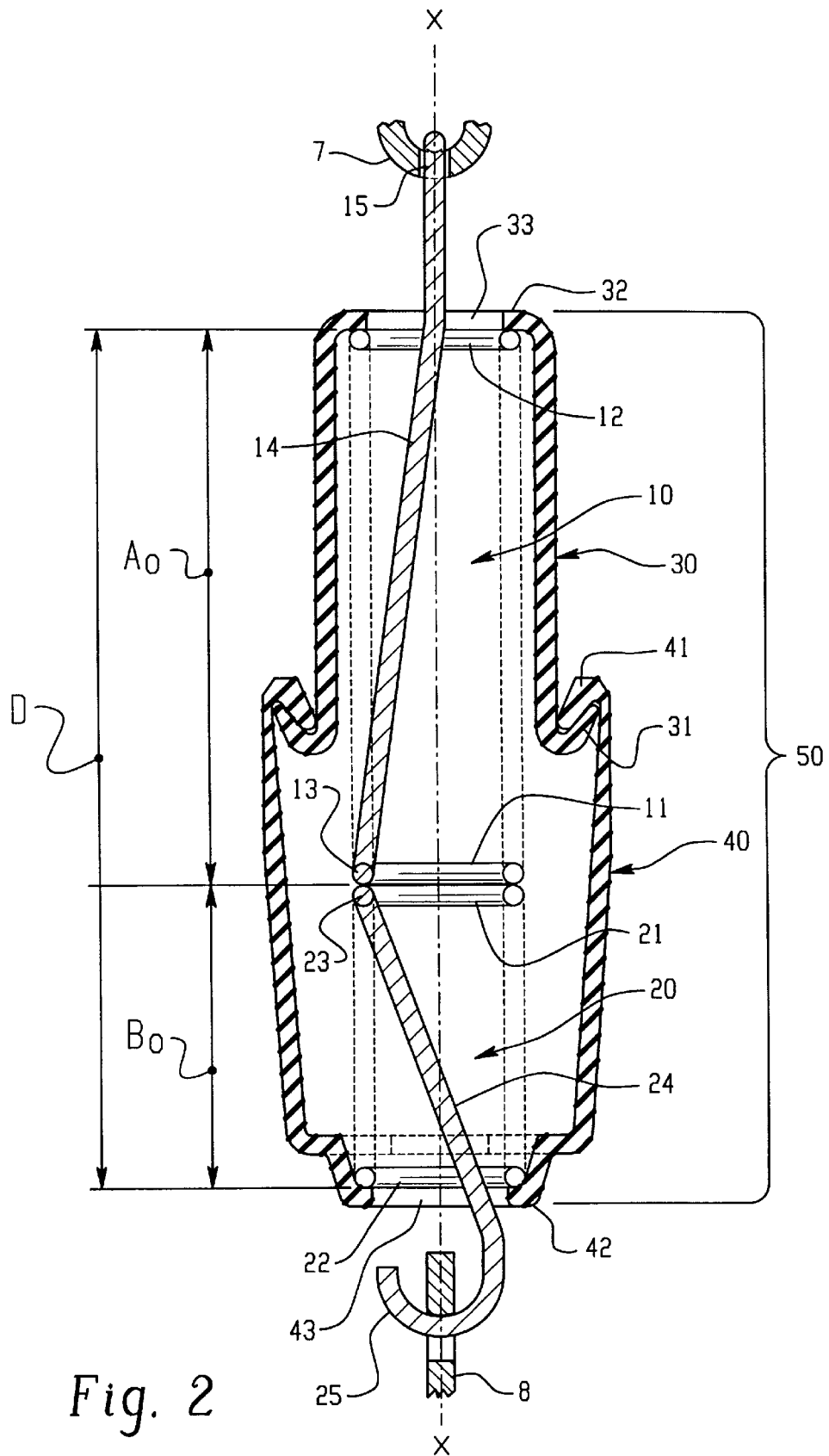
FIGS. 2 and 3 are longitudinal-section views of one of the anchoring devices of the washing assembly of the washing machine illustrated in FIG. 1, as it appears in two different phases of a washing cycle.
Figure 3:
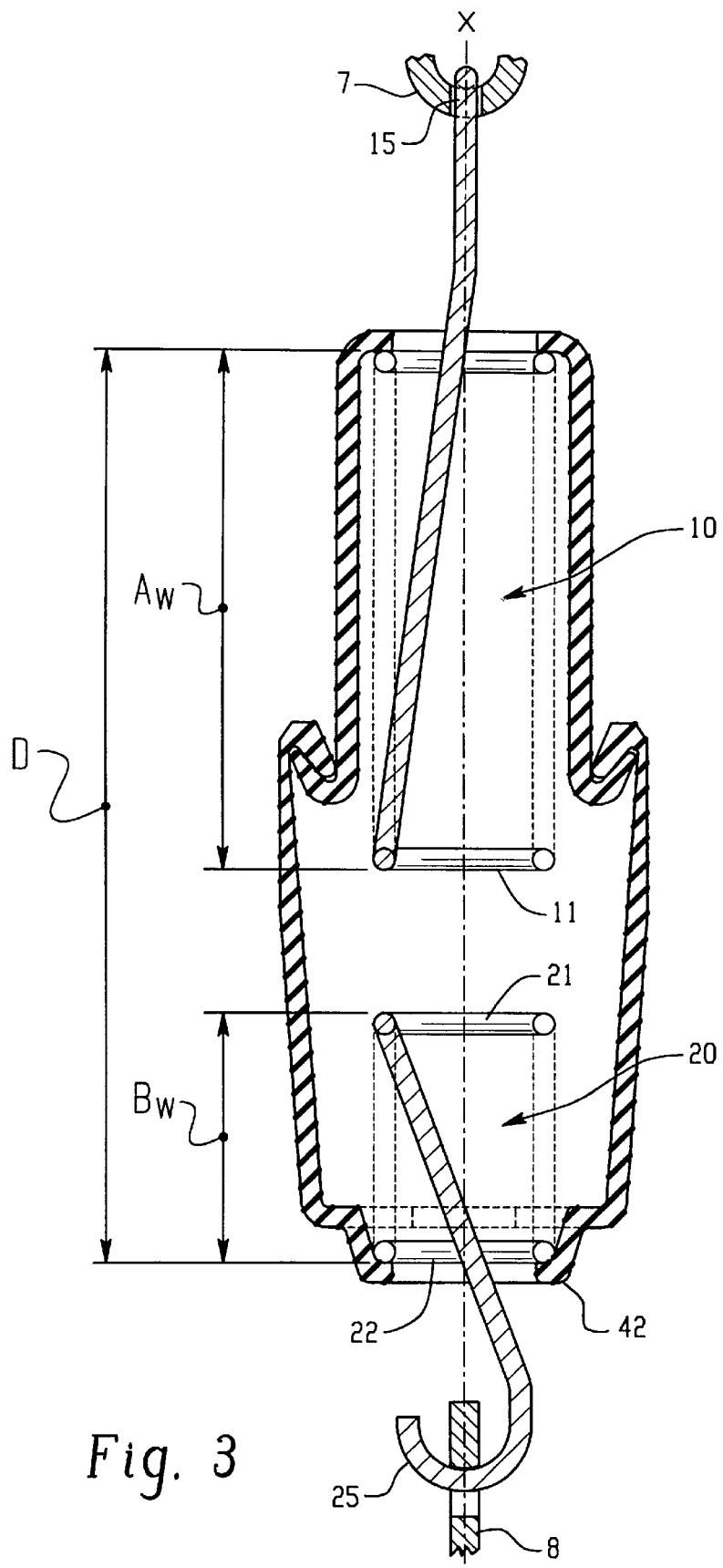

FIGS. 2 and 3 are sectional views of a preferred embodiment of the anchoring device 2 of the washing assembly according to the present invention. The anchoring device 2 includes a pair of special helical springs 10 and 20, which are arranged coaxially in series within a housing 50.

The first such helical spring 10 has end portions in the form of first and second circular coils 11 and 12. From a point 13 on said first end coil 11 a relatively rigid prolongation 14 extends in an uninterrupted manner. Said prolongation 14, which is substantially rectilinear, extends inwardly into the spring 10. Its free end 15, which is in the shape of a hook, is aligned along a common axis x—x of the two springs 10 and 20 and protrudes beyond the opposite end coil 12 of the first helical spring 10.

The second helical spring 20, has the same configuration as the first spring 10, with end portions in the shape of first and second circular coil 21 and 22. The second spring 20 is shorter than the first spring 10. From a point 23 on said first end coil 21, a relatively rigid prolongation 24 extends in an uninterrupted manner. Said prolongation 24, which is also substantially rectilinear, extends inwardly into the spring 20. A free end 25, which is in the shape of a hook, is aligned along the common axis x—x of the two springs 10 and 20 and protrudes beyond the opposite end coil 22 of the same second helical spring 20. It therefore ensues that the helical springs 10 and 20 are in an opposite arrangement with respect to a plane that extends transversely to the axis x—x.

The housing 50 includes first and second parts 30 and 40 which are in the shape of cups and extend along the axis x—x. The parts are provided along their mouth portions with respective male and female protrusions 31 and 41 to enable them to be snap-fitted together. Elongated apertures 33 and 43 are provided in the respective bottom portions 32 and 42. Owing to reasons that will be better explained below, said parts 30 and 40 are made of a material featuring adequate strength. The junction between the two parts is such as to enable the housing 50 to be subsequently separated, with the use of a suitable tool, for instance in the case that repairs have to be carried out in the course of the life of the washing machine in which said anchoring device 2 is installed.

The helical springs 10 and 20 are inserted in the first part 30 and the second part 40, respectively, of the housing 50, so that the hook-shaped free end portions 15 and 25 of the prolongations 14 and 24 are able to protrude from the bottom portions 32 and 42, respectively, through the elongated apertures 33 and 43 that are perpendicular to the axis x—x.

The housing parts 30 and 40 are joined at the snap-fitting or similar junction such that said first end coils 11 and 21 of the springs 10 and 20 are brought into contact with each other, while said second end coils 12 and 22 of the springs are caused to abut against the bottom portions 32 and 42, respectively, as shown in FIG. 2.

The component parts of the anchoring device 2 according to the present invention are so sized as to ensure that a distance D between the bottom portions 32 and 42 of the housing 50, is such that $D=(A_o+B_o)<(A_R+B_R)$, where $A_R$ and $B_R$ are the respective free lengths of the springs 10 and 20 before assembly. Thus, when they are assembled, the springs 10 and 20 undergo a pre-compression that reduces their length from $A_R$ to $A_o$ and $B_R$ to $B_o$, respectively.

After assembly, the anchoring device 2 can be mounted in the washing machine. The hook provided at the free end portion 15 of the prolongation 14 of the first spring 10 is anchored on to the eyelet 7 on the stationary structure or casing 1 of the washing machine and the hook provided at the free end portion 25 of the prolongation 24 of the other spring 20 is anchored on to the eyelet 8 on the tub 4 of the washing assembly 3, or vice-versa. Accordingly, the springs 10, 20 undergo a further, albeit relatively modest, pre-compression that makes them still shorter since their second end coils 12 and 22 remain constantly in a position in which they are abutting against the bottom portions 32 and 42 of the housing 50.

Upon having been loaded with the clothes to be washed, and the water required to perform the related washing cycle, the washing assembly 3 may weigh up to 35 kg. This causes the hooks 15 and 25 to move away from each other and, therefore, causes further compression of the springs 10 and 20 which become even shorter along their common axis x—x, while their second end coils 12, 22 push against the bottom portions 32, 22. Thus, the housing 50 must be manufactured using a material featuring an adequate level of mechanical strength, which may for instance be an injection-molded engineering polymer. Preferably, when the washing assembly has been loaded with the washload and the wash liquid so as to weigh as much as approximately 35 kg, and is therefore ready to start a washing cycle, lengths $A_w$ and $B_w$ reached by the springs 10 and 20, respectively, are such that the first end coils 11 and 21 of the helical springs 10 and 20 separate from each other (see FIG. 3) and at least the shorter spring 10 is fully compressed. Thus, the shorter spring 10 has a length $A_w=A_{mn}$ such that the anchoring device 2 becomes very rigid.

In this way, the washing assembly 3 keeps substantially still, ie. does not move, with respect to the stationary structure 1 of the washing machine, without any risk of shocks, throughout the various phases of the washing cycle that are carried out with the drum 5 full of clothes and wash liquid and rotating at a low speed (for instance in the order of approximately 60 to 80 rpm).

When, in accordance with the washing cycle, the wash liquid is drained from the drum 5 and the drum is driven to rotate at a high revolution speed (up to 1,500 rpm) for a final spin-extraction phase, the washing assembly 3 is considerably lightened to the extent that it weighs in the order of 22 kg or so. This markedly reduces the compression stress imposed on the springs 10 and 20. These springs extend at this point to a length $A_s$ and $B_s$, respectively, where $A_w<A_s\leq A_o$ and $B_w<B_s\leq B_o$, so that their first end coils 11 and 21 come into or near contact with each other. In the phases of the washing cycle in which the drum 5 of the washing machine rotates at a high speed, the anchoring device 2 finds itself with the springs 10 and 20 working in series with each other, so that its elastic constant reaches such a value as to effectively reduce the transmission of the oscillations of the washing assembly 3 to the stationary structure 1, this being effective in bringing about obvious advantages, particularly in the case of unbalanced washloads in the rotating drum.

It clearly emerges from the above description that, from a construction point of view, the anchoring device 2 has advantageously a particularly simple and low-cost construction, so that it ultimately has a minimal impact on the overall cost of the washing machine. From an operational point of view, the described anchoring device has the advantage that its elastic constant has the ability of immediately and automatically adapting to the different conditions that are encountered during a washing cycle, ie. the different weights of the washing assembly 3 and the different revolving speeds of the rotating drum 5.

Although the above description has been given with reference to a preferred embodiment of the present invention, it will be appreciated that a number of further embodiments and variants may be inferentially developed by those skilled in the art without departing from the scope of the present invention.

What is claimed is:

1. A washing machine comprising:
    a washing assembly (3) including a wash tub (4) and a rotating drum (5);
    a stationary structure (1); and
    at least one anchoring device (2) anchoring the washing assembly to the stationary structure, wherein the anchoring device includes at least first and second elastic elements (10, 20; 40, 50, 60) arranged in series with respect to each other and enclosed in a substantially rigid housing (50), wherein
    first end portions (11, 21) of the elastic elements are provided with integral associated rigid elements (14, 24),
    the housing includes parts (32, 42) acting as abutments for second end portions (12, 22) of the elastic elements (10, 20) so that the elastic elements are under a compression stress that varies during operation of the washing machine,
    the housing parts (32, 42) have apertures (33, 43), and free end portions (15, 25) of the rigid elements define anchoring points of the anchoring device (2) and protrude in opposite directions from the apertures (33, 43).

2. A washing machine according to claim 1, characterized in that said anchoring points for attachment of the free ends (15, 25) of said rigid elements (14, 24) are substantially aligned along a same axis (x—x) of said elastic elements (10, 20).

3. A washing machine according to claim 1, characterized in that during at least a part of the operation of the washing machine, said first end portions (11, 21) of said elastic elements (10, 20) are in contact with each other, and during at least another part of the operation of the washing machine, the first end portions (11, 21) of said elastic elements (10, 20) are separated from each other.

4. A washing machine according to any of the preceding claims, wherein said elastic elements (10, 20) are in the form of helical springs and their first and second end portions (11, 12; 21, 22) comprise circular coils, characterized in that said rigid elements (14, 2) comprise prolongations extending in a continuous manner into the respective elastic elements (10, 20) from a point (13, 23) on said first end portions (11,21).

5. A washing machine according to any of claims 1 to 3, characterized in that said housing (50) comprises two parts (30, 40) which are preferably molded from an engineering polymer and are integrally provided with separable joinable means (31, 41) enabling said parts to be fastened together.

6. A washing machine according to claim 5, characterized in that said two parts (30, 40) of the housing (50) are in the shape of cups and that said apertures (33, 43) for the rigid end portions (15, 25) of said rigid elements (14, 24) are provided in mutually opposing bottom portions (32, 42) of the same parts (30, 40).

7. A washing machine according to any of claims 1 to 3, characterized in that the free end portions (15, 25) of said rigid elements (14, 24) are in the shape of hooks capable of being respectively anchored on to each of the stationary structure (1) and the washing assembly (3).

* * * * *